US009337524B2

(12) United States Patent
Yang et al.

(10) Patent No.: US 9,337,524 B2
(45) Date of Patent: May 10, 2016

(54) FIXING MECHANISM AND ANTENNA DEVICE THEREWITH

(71) Applicant: Wistron NeWeb Corporation, Hsinchu (TW)

(72) Inventors: Lan-Chun Yang, Hsinchu (TW); Ming-Chan Lee, Hsinchu (TW); Yi-Chieh Lin, Hsinchu (TW); Hung-Yuan Lin, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 444 days.

(21) Appl. No.: 13/798,098

(22) Filed: Mar. 13, 2013

(65) Prior Publication Data

US 2014/0119818 A1    May 1, 2014

Related U.S. Application Data

(60) Provisional application No. 61/721,481, filed on Nov. 1, 2012.

(30) Foreign Application Priority Data

Dec. 12, 2012  (TW) ................................. 101146985

(51) Int. Cl.
| *F16B 5/00* | (2006.01) |
| *F16B 5/06* | (2006.01) |
| *H01Q 1/12* | (2006.01) |
| *H01Q 19/13* | (2006.01) |

(52) U.S. Cl.
CPC ............. *H01Q 1/1228* (2013.01); *F16B 5/0088* (2013.01); *F16B 5/0621* (2013.01); *H01Q 19/13* (2013.01); *Y10T 403/595* (2015.01)

(58) Field of Classification Search
CPC ...... F16B 5/0088; F16B 5/0621; F16B 5/065; F16B 12/2009; F16B 12/2027; F16B 2005/0671; H01Q 1/1207; H01Q 1/1228; H01Q 19/13
USPC ........ 403/109.6, 322.1, 322.4, 325–327, 378, 403/380, DIG. 4
See application file for complete search history.

(56) References Cited

U.S. PATENT DOCUMENTS 3,709,088 A * 1/1973 Pitzer .............................. 411/70
4,400,038 A * 8/1983 Hosokawa ................. 301/124.2
(Continued)

FOREIGN PATENT DOCUMENTS

| TW | I257734 | 7/2006 |
| TW | M403760 | 5/2011 |

*Primary Examiner* — Josh Skroupa
(74) *Attorney, Agent, or Firm* — Winston Hsu; Scott Margo (57) ABSTRACT

A fixing mechanism includes a shaft, a constraining member, a sleeve member, a resilient bushing, a pivot member and a handle. The constraining member is connected to an end portion of the shaft. The sleeve member sheathes the shaft. The resilient bushing sheathes the shaft and is disposed between the constraining member and the sleeve member. The pivot member is connected to the other end portion of the shaft. The handle is pivoted to the pivot member and abuts against the sleeve member. The handle pushes the sleeve member and drives the pivot member to activate the shaft to pull the constraining member when the handle pivots relative to the pivot member, so that the constraining member and the sleeve member cooperatively compress the resilient bushing, so as to make the resilient bushing generate a radial deformation.

12 Claims, 9 Drawing Sheets

(56) References Cited

U.S. PATENT DOCUMENTS

| | | | |
|---|---|---|---|
| 5,368,347 A * | 11/1994 | Holtman et al. | 292/257 |
| 5,526,661 A | 6/1996 | Lin | |
| 5,931,516 A * | 8/1999 | Holtman et al. | 292/257 |
| 6,338,649 B1 | 1/2002 | Smith | |
| 7,385,564 B2 * | 6/2008 | Zihlman | 343/878 |
| 7,665,928 B2 | 2/2010 | Winefordner | |
| 8,025,455 B2 * | 9/2011 | Huang et al. | 403/322.4 |
| 8,196,789 B2 * | 6/2012 | Kraeuter et al. | 224/315 |
| 8,573,879 B2 * | 11/2013 | Chang | 403/322.4 |
| 8,780,008 B2 | 7/2014 | Lettkeman | |
| 2007/0210978 A1 | 9/2007 | Zihlman | |
| 2011/0193764 A1 | 8/2011 | Shen | |

* cited by examiner

FIXING MECHANISM AND ANTENNA DEVICE THEREWITH

CROSS REFERENCE TO RELATED APPLICATIONS

This application is a non-provisional application of a U.S. provisional application Ser. No. 61/721,481, filed Nov. 1, 2012.

BACKGROUND OF THE INVENTION

1. Field of the Invention

The present invention relates to a fixing mechanism and an antenna device therewith, and more particularly, to a fixing mechanism with easy assembly and an antenna device therewith.

2. Description of the Prior Art

A conventional antenna device includes a holder, a supporting tube and a fixing mechanism. The supporting tube is used for supporting the holder, and the holder is used for holding an antenna component, so that the antenna component is capable of receiving antenna signals. The fixing mechanism is used for fixing the holder and the supporting tube, so that the supporting tube supports the holder stably. Conventionally, the fixing mechanism fixes the holder and the supporting tube in a screwed and manually manner, so that the holder firmly fixes the supporting tube. The aforesaid design requires additional tools, such as a screw driver, for screwing, resulting in complex process of assembly, and thus it is not convenient for a user to install and use.

SUMMARY OF THE INVENTION

The present invention provides a fixing mechanism with easy assembly and an antenna device therewith for solving above drawbacks.

According to an embodiment of the present invention, a fixing mechanism includes a shaft, a constraining member, a sleeve member, a resilient bushing, a pivot member and a handle. The constraining member is connected to an end portion of the shaft. The sleeve member sheathes the shaft. The resilient bushing sheathes the shaft and is disposed between the constraining member and the sleeve member. The pivot member is connected to the other end portion of the shaft. The handle is pivoted to the pivot member and abuts against the sleeve member. The handle pushes the sleeve member and drives the pivot member to activate the shaft to pull the constraining member when the handle pivots relative to the pivot member, so that the constraining member and the sleeve member cooperatively compress the resilient bushing, so as to make the resilient bushing generate a radial deformation.

According to another embodiment of the present invention, the sleeve member includes a sleeve portion and a stop portion. The sleeve portion sheathes the shaft and is for abutting against the resilient bushing. The stop portion is connected to the sleeve portion and abuts against the handle. The stop portion is pushed to drive the sleeve portion to compress the resilient bushing by the handle when the handle pivots relative to the pivot member.

According to another embodiment of the present invention, the handle includes a pivotal portion, a pressing cam and a handle portion. The pivotal portion is pivoted to the pivot member. The pressing cam protrudes from the pivotal portion. The handle portion is connected to the pivotal portion, and the handle portion is for rotating the pivotal portion to drive the pressing cam to press the stop portion of the sleeve member.

According to another embodiment of the present invention, the pivot member is screwed to the other end portion of the shaft.

According to another embodiment of the present invention, the constraining member and the end portion of the shaft are integrally formed.

According to another embodiment of the present invention, the fixing mechanism is for fixing a first frame and a second frame, and the second frame is detachably installed on the first frame. The first frame includes a first fixing structure, and the second frame includes a second fixing structure. The sleeve member is disposed through the first fixing structure of the first frame and the second fixing structure of the second frame when the first frame is installed on the second frame. The resilient bushing is exposed on the first frame and the second frame when the sleeve member is disposed through the first fixing structure of the first frame and the second fixing structure of the second frame. The resilient bushing engages with the first fixing structure of the first frame and the second fixing structure of the second frame as being compressed to generate the radial deformation by the constraining member and the sleeve member.

According to another embodiment of the present invention, the first frame is an antenna holder, and the second frame is an antenna supporting tube.

According to another embodiment of the present invention, an antenna device includes a first frame, a second frame and a fixing mechanism. The first frame includes a first fixing structure. The second frame is detachably installed on the first frame, and the second frame includes a second fixing structure. The fixing mechanism is for fixing the first frame and the second frame and includes a shaft, a constraining member, a sleeve member, a resilient bushing, a pivot member and a handle. The constraining member is connected to an end portion of the shaft. The sleeve member sheathes the shaft, and the sleeve member is disposed through the first fixing structure of the first frame and the second fixing structure of the second frame when the first frame is installed on the second frame. The resilient bushing sheathes the shaft and is disposed between the constraining member and the sleeve member. The resilient bushing is exposed on the first frame and the second frame when the sleeve member is disposed through the first fixing structure of the first frame and the second fixing structure of the second frame. The pivot member is connected to the other end portion of the shaft. The handle is pivoted to the pivot member and abuts against the sleeve member. The handle pushes the sleeve member and drives the pivot member to activate the shaft to pull the constraining member when the handle pivots relative to the pivot member, so that the constraining member and the sleeve member cooperatively compress the resilient bushing, so as to make the resilient bushing generate a radial deformation for engaging with the first fixing structure of the first frame and the second fixing structure of the second frame.

According to another embodiment of the present invention, the first fixing structure and the second fixing structure are respectively a through hole structure.

In summary, the fixing mechanism of the present invention utilizes the handle for pushing the sleeve member and for driving the pivot member to activate the shaft as the handle is rotated, so as to pull the constraining member for making the constraining member and the sleeve member cooperatively compress the resilient bushing, resulting in that the resilient bushing generates the radial deformation for engaging with the first fixing structure of the first frame and the second fixing structure of the second frame. In other words, the fixing mechanism of the present invention is capable of fixing first frame and the second frame without screws, and the fixing mechanism of the present invention fixes the first frame and the second frame by rotating the handle. As a result, it results in easy assembly and convenience for a user to install and use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention maybe practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments maybe utilized and structural changes maybe made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
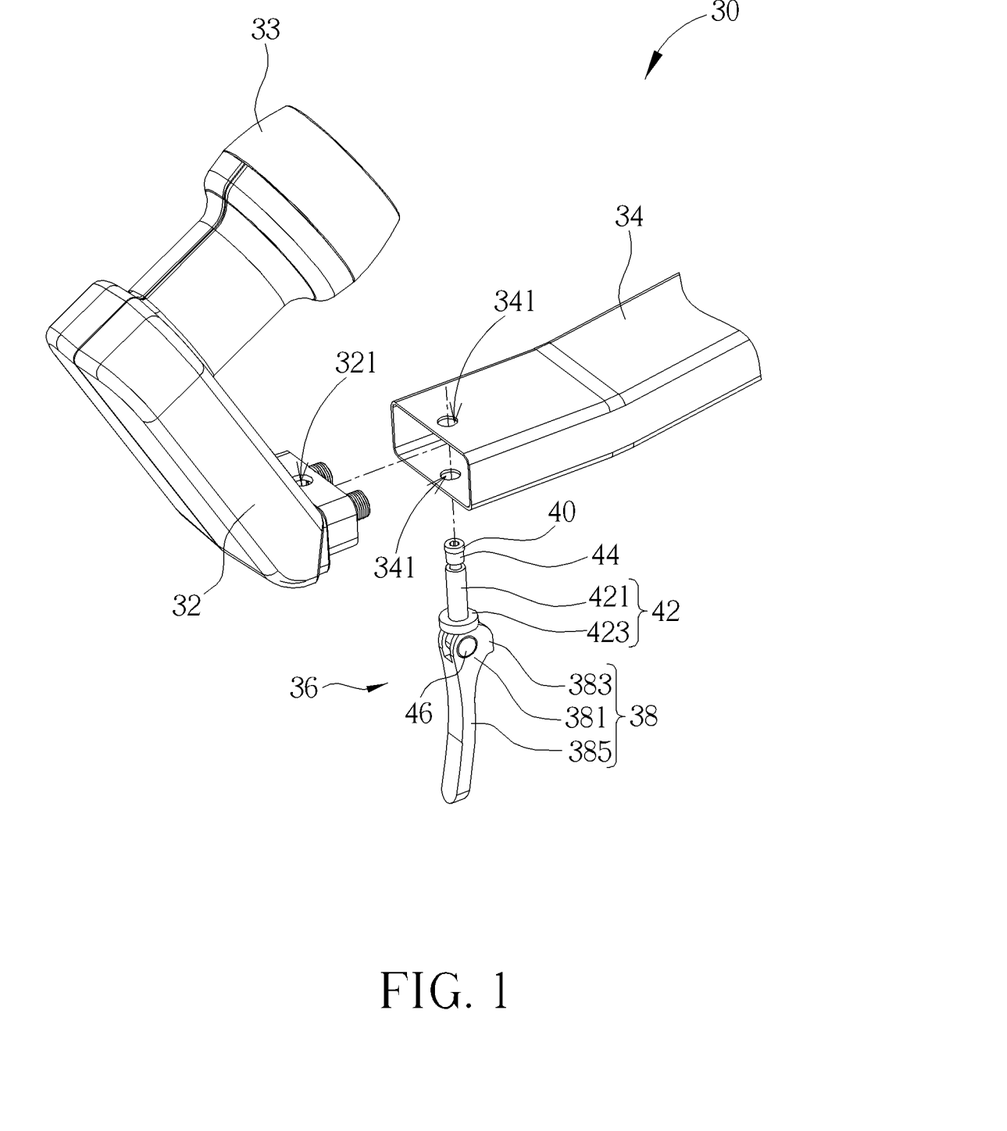
FIG. 1 is an exploded diagram of an antenna device according to an embodiment of the present invention.

Please refer to FIG. 1. FIG. 1 is an exploded diagram of an antenna device 30 according to an embodiment of the present invention. As shown in FIG. 1, the antenna device 30 includes a first frame 32, a second frame 34 and a fixing mechanism 36. The second frame 34 is detachably installed on the first frame 32, and the fixing mechanism 36 is used for fixing the first frame 32 and the second frame 34 when the second frame 34 is installed on the first frame 32. In this embodiment, the first frame 32 is an antenna holder for holding an antenna component 33, and the second frame 34 is an antenna supporting tube for supporting the antenna holder (i.e. the first frame 32) on a fixing plane, such as a ground. Accordingly, the antenna component 33 is capable of being stably fixed on the fixing plane by utilizing the first frame 32 (i.e. the antenna holder) and the second frame 34 (i.e. the antenna supporting tube) for receiving antenna signals.

Figure 2:
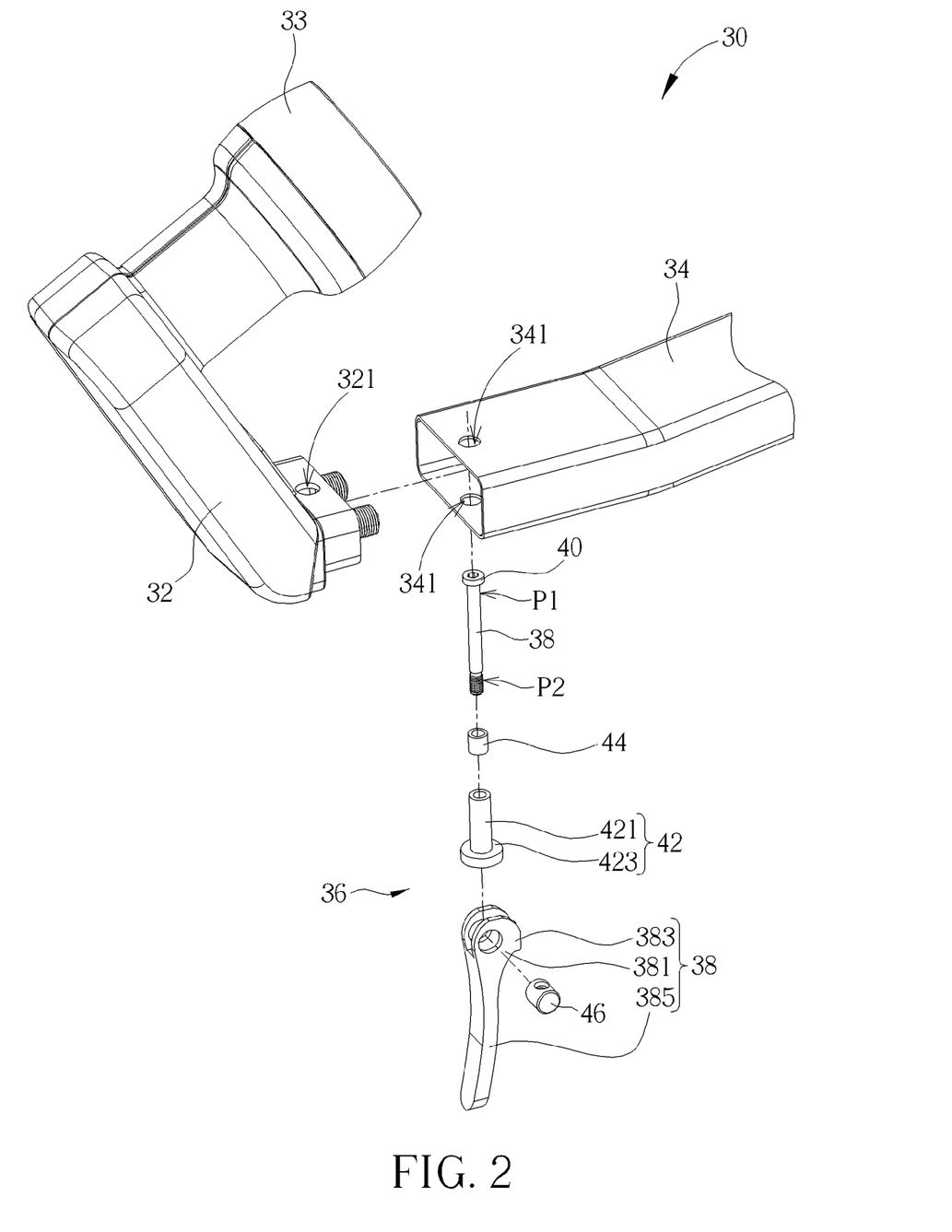
FIG. 2 is an exploded diagram of a first frame, a second frame and a fixing mechanism according to the embodiment of the present invention.

Please refer to FIG. 1 and FIG. 2. FIG. 2 is an exploded diagram of the first frame 32, the second frame 34 and the fixing mechanism 36 according to the embodiment of the present invention. As shown in FIG. 1 and FIG. 2, the first frame 32 includes a first fixing structure 321, and the second frame 34 includes a second fixing structure 341. In this embodiment, the first fixing structure 321 and the second fixing structure 341 are respectively a through hole structure. Furthermore, the fixing mechanism 36 includes a shaft 38, a constraining member 40, a sleeve member 42, a resilient bushing 44, a pivot member 46 and a handle 48. The constraining member 40 is connected to a first end portion P1 of the shaft 38. Both of the sleeve member 42 and the resilient bushing 44 sheathe the shaft 38, and the resilient bushing 44 is disposed between the constraining member 40 and the sleeve member 42. The pivot member 46 is connected to a second end portion P2 opposite to the first end portion P1 of the shaft 38, and the handle 48 is pivoted to the pivot member 46 and abuts against the sleeve member 42.

In this embodiment, the pivot member 46 is, but not limited to, screwed to the second end portion P2 of the shaft 38. For example, the pivot member 46 and the second end portion P2 of the shaft 38 can be integrally formed as well. As for which one of the above-mentioned designs is adopted, it depends on practical demands. Furthermore, the constraining member 40 and the first end portion P1 of the shaft 38 are integrally formed, i.e. practically, the shaft 38 and the constraining member 40 are a shaft portion and a screw head portion of a screw component, respectively. Structures of the constraining member 40 and the shaft 38 are not limited to those mentioned in this embodiment. For example, the constraining member 40 and the shaft 38 can be two separate parts as well. As for which one of the above-mentioned designs is adopted, it depends on practical demands.

Furthermore, the sleeve member 42 includes a sleeve portion 421 and a stop portion 423. The sleeve portion 421 sheathes the shaft 38 and for abutting against the resilient bushing 44. The stop portion 423 is connected to the sleeve portion 421 and abuts against the handle 48. In addition, the handle 48 includes a pivotal portion 481, a pressing cam 483 and a handle portion 485. The pivotal portion 481 is pivoted to the pivot member 46. The pressing cam 483 protrudes from the pivotal portion 481 and is capable of rotating with the pivotal portion 481. The handle portion 485 is connected to the pivotal portion 481. The handle portion 485 drives the pivotal portion 481 and the pressing cam 483 to rotate relative to the pivot member 46 as being exerted by an external force.

Figure 3:
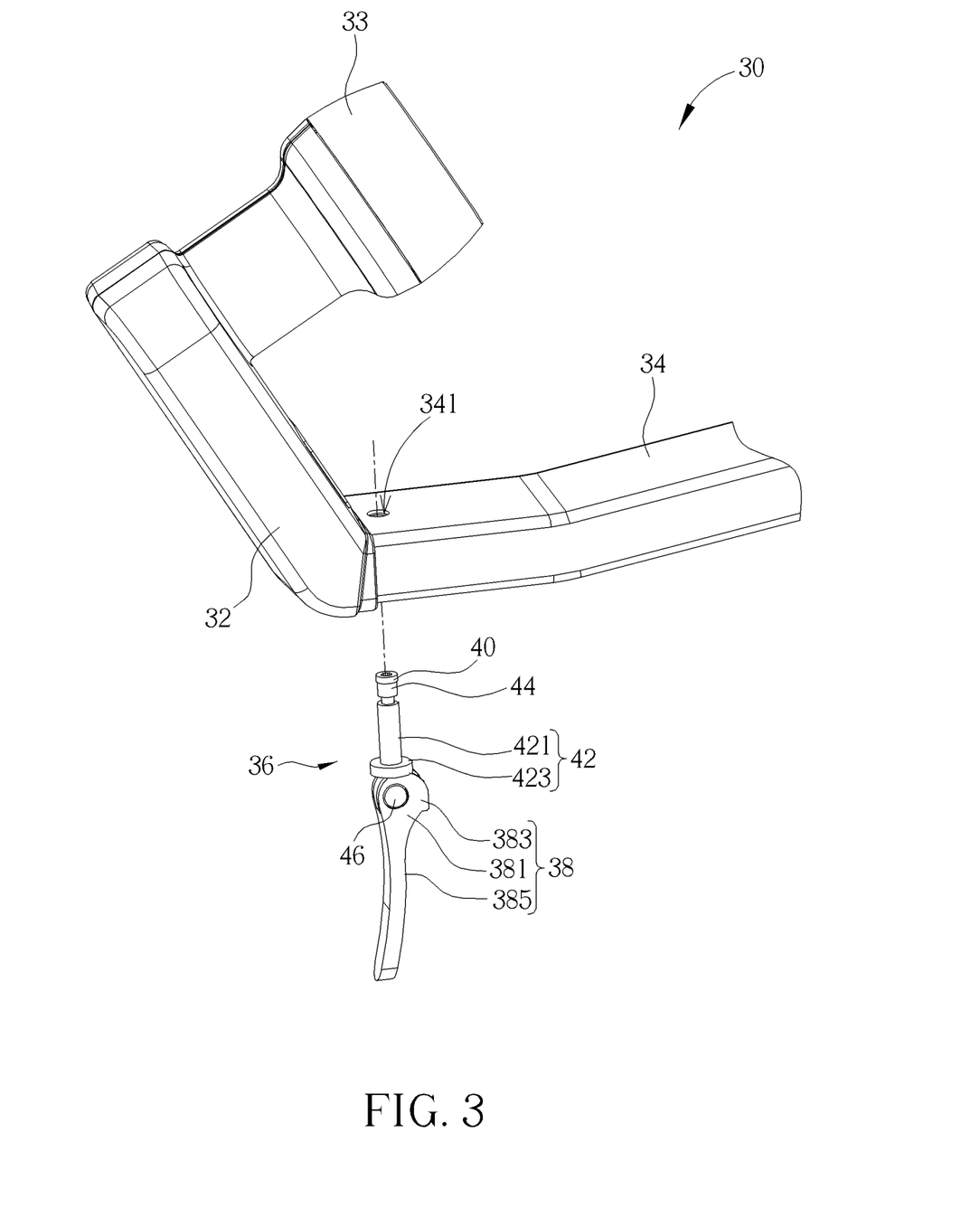
FIG. 3 and FIG. 4 are diagrams of the first frame, the second frame and the fixing mechanism in different assembled statuses according to the embodiment of the present invention.
Figure 4:
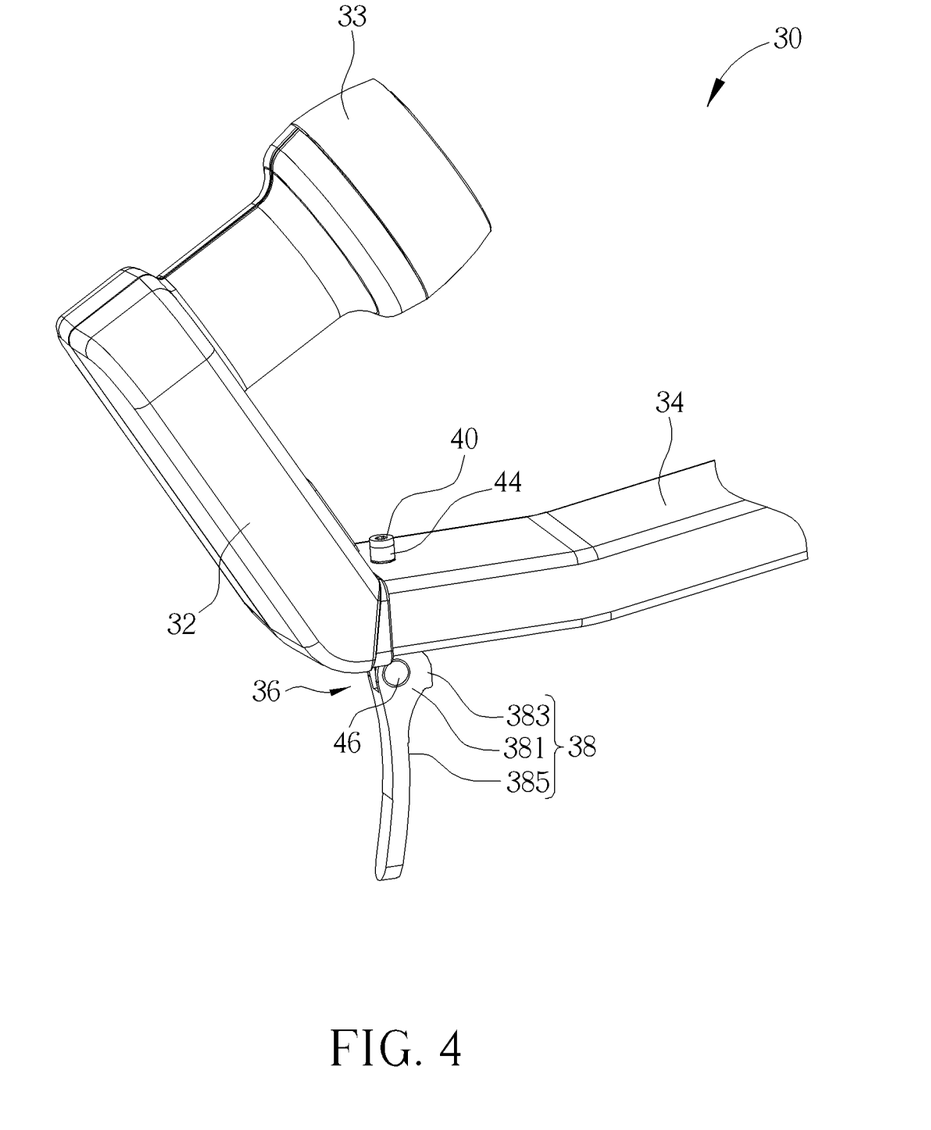

Detailed descriptions for principles of the fixing mechanism 36 are provided as follows. Please refer to FIG. 1, FIG. 3 and FIG. 4. FIG. 3 and FIG. 4 are diagrams of the first frame 32, the second frame 34 and the fixing mechanism 36 in different assembled statuses according to the embodiment of the present invention. As shown in FIG. 1, FIG. 3 and FIG. 4, at first, the first frame 32 is inserted into the second frame 34 from a position shown in FIG. 1 until the first frame 32 achieves a position shown in FIG. 3. Meanwhile, the first fixing structure 321 of the first frame 32 is aligned with the second fixing structure 341 of the second frame 34. Afterwards, the sleeve member 42 of the fixing mechanism 36 is disposed through the first fixing structure 321 of the first frame 32 and the second fixing structure 341 of the second frame 34 until the resilient bushing 44 of the fixing mechanism 36 is exposed on the first frame 32 and the second frame 34, as shown in FIG. 4. Accordingly, the fixing mechanism 36 is capable of constraining the first frame 32 from separating from the second frame 34.

Figure 5:
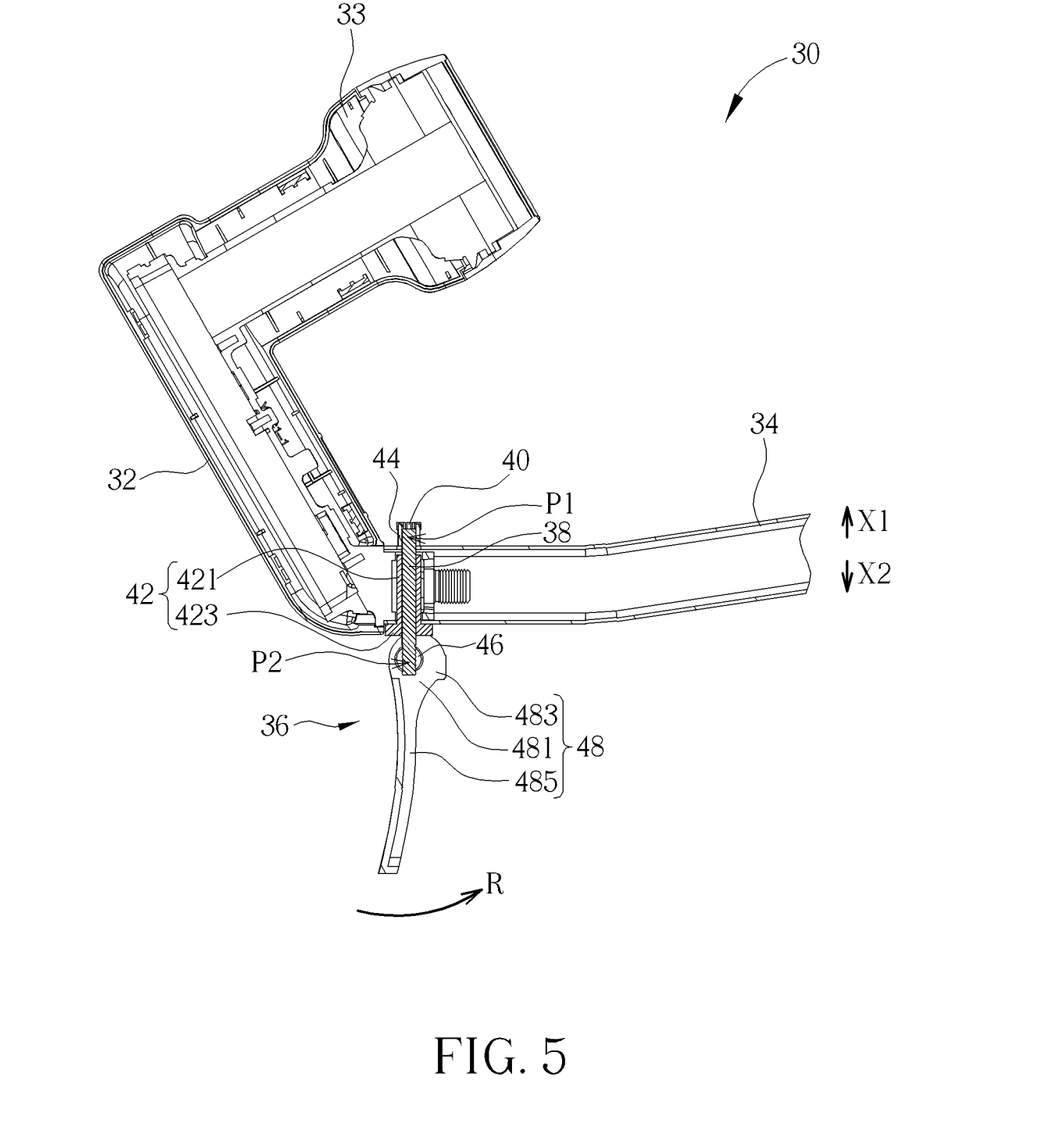
FIG. 5 is a sectional diagram of the first frame, the second frame and the fixing mechanism in an assembled status according to the embodiment of the present invention.
Figure 6:
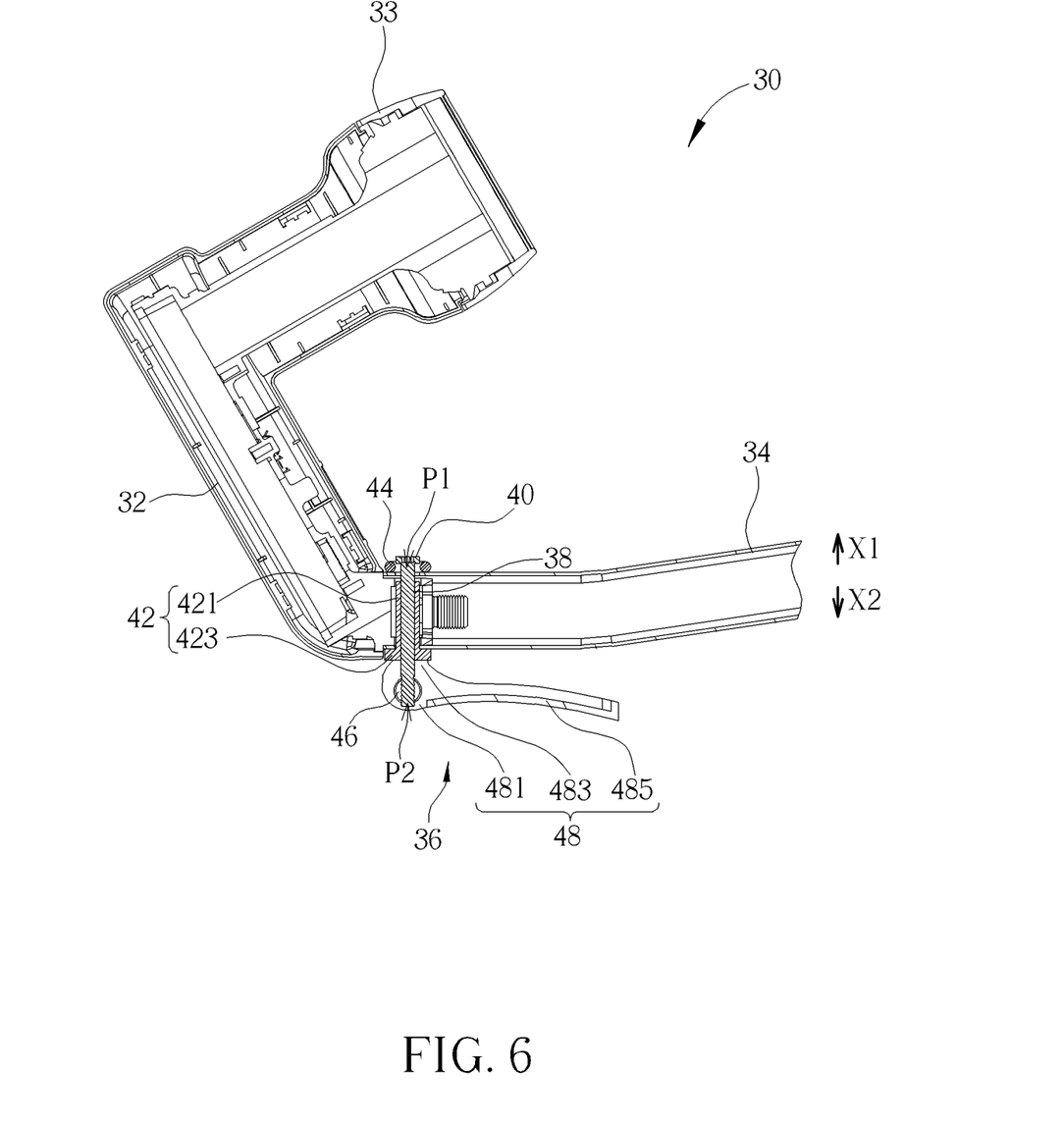
FIG. 6 is a sectional diagram of the first frame, the second frame and the fixing mechanism in a fixed status according to the embodiment of the present invention.

Please refer to FIG. 5 and FIG. 6. FIG. 5 is a sectional diagram of the first frame 32, the second frame 34 and the fixing mechanism 36 in an assembled status according to the embodiment of the present invention. FIG. 6 is a sectional diagram of the first frame 32, the second frame 34 and the fixing mechanism 36 in a fixed status according to the embodiment of the present invention. As shown in FIG. 5 and FIG. 6, when the first frame 32 and the second frame 34 of the antenna device 30 are desired to be fixed, the handle portion 485 of the handle 48 is rotated in a rotating direction R shown in FIG. 5 first, so as to drive the pivotal portion 481 and the pressing cam 483 to rotate relative to the pivot member 46. Furthermore, during the pivotal portion 481 and the pressing cam 483 rotates relative to the pivot member 46, the pressing cam 483 abuts against the stop portion 423 of the sleeve member 42 and further presses the stop portion 423 of the sleeve member 42. Meanwhile, the stop portion 423 of the sleeve member 42 is pushed by the pressing cam 483 of the handle 48 for driving the sleeve portion 421 of the sleeve member 42 to compress the resilient bushing 44 in a first direction X1.

On the other hand, when the handle portion 485 of the handle 48 is rotated in the rotating direction R shown in FIG. 5, the pressing cam 483 of the handle 48 slides along a bottom surface of the stop portion 423 of the sleeve member 42. Meanwhile, by motion of the pressing cam 483 of the handle 48 relative to the stop portion 423 of the sleeve member 42, the pressing cam 483 can drive the pivotal portion 481 of the handle 48 to move in a second direction X2 opposite to the first direction X1. Furthermore, since the pivotal portion 481 is pivoted to the pivot member 46, the pivotal portion 481 of the handle 48 drives the pivot member 46 to activate the shaft 38 to move in the second direction X2 during the handle portion 485 of the handle 48 is rotated in the rotating direction R shown in FIG. 5. Meanwhile, the constraining member 40 is pulled by the shaft 38 to compress the resilient bushing 44 in the second direction X2.

In other words, during the handle portion 485 of the handle 48 is rotated in the rotating direction R shown in FIG. 5, the handle 48 drives the sleeve member 42 to move in the first direction X1 and simultaneously pulls the constraining member 40 to move in the second direction X2 opposite to the first direction X1. Accordingly, the constraining member 40 and the sleeve portion 421 of the sleeve member 42 can cooperatively compress the resilient bushing 44, so as to make the resilient bushing 44 generate a radial deformation, as shown in FIG. 6. Meanwhile, the resilient bushing 44 with the radial deformation can not pass the first fixing structure 321 of the first frame 32 and the second fixing structure 341 of the second frame 34. In other words, the resilient bushing 44 with the radial deformation can engage with the first fixing structure 321 and the second fixing structure 341.

During the handle 48 drives the sleeve member 42 and the constraining member 40 to compress the resilient bushing 44, the pressing cam 483 of the handle 48 pushes the sleeve portion 421 of the sleeve member 42, so that the sleeve portion 421 presses a side of the first frame 32 and the second frame 34 and the constraining member 40 is pulled simultaneously to press another side of the first frame 32 and the second frame 34 cooperatively with the resilient bushing 44. Accordingly, the fixing mechanism 36 can hold the first frame 32 and the second frame 34, so that the first frame 32 is stably installed on the second frame 34. In such a manner, the fixing mechanism 36 is capable of fixing the first frame 32 and the second frame 34 of the antenna device 30, so that the antenna component 33 is stably disposed on the first frame 32 and the second frame 34 for receiving the antenna signals.

Figure 7:
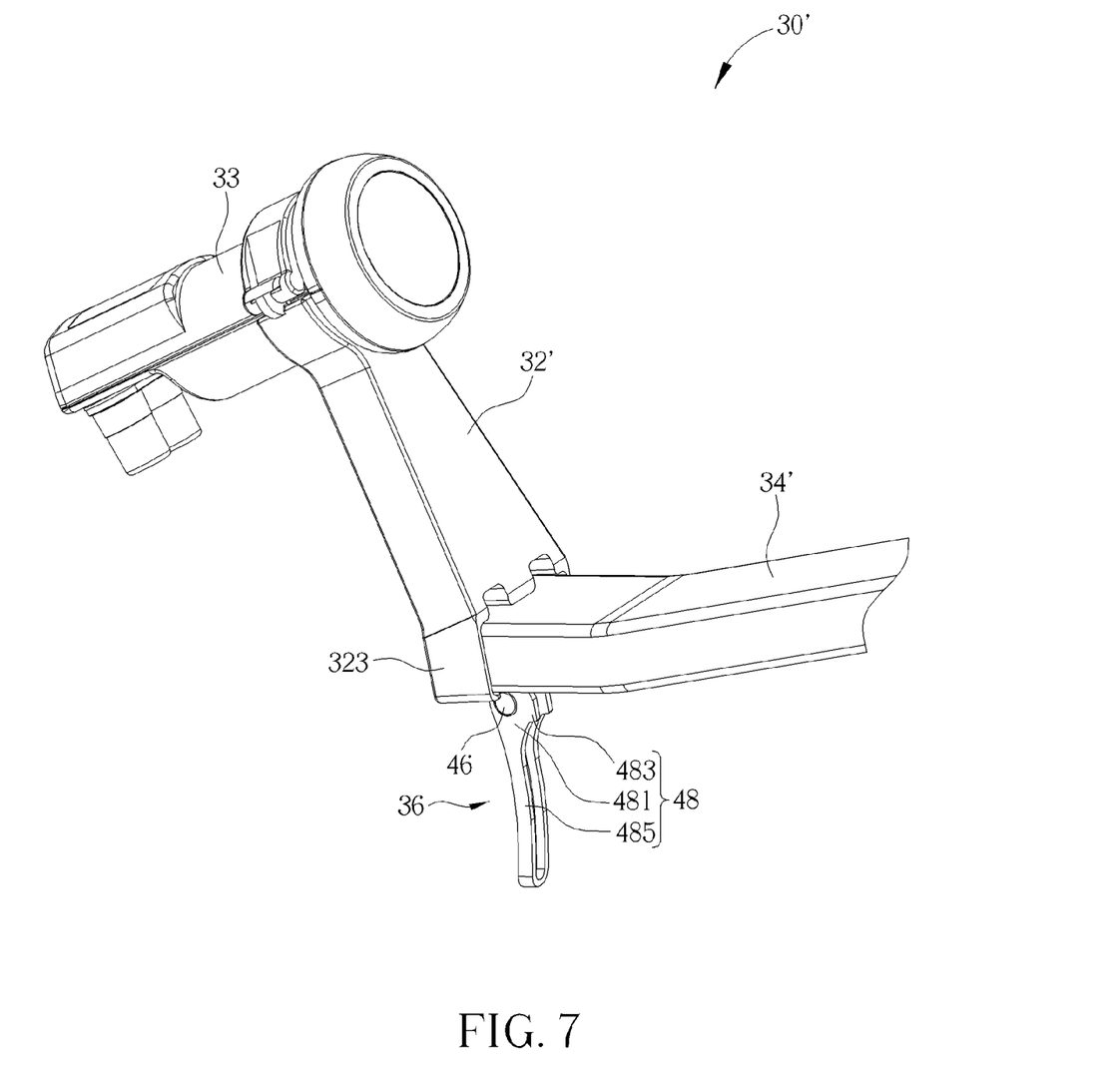
FIG. 7 is a diagram of an antenna device according to another embodiment of the present invention.
Figure 8:
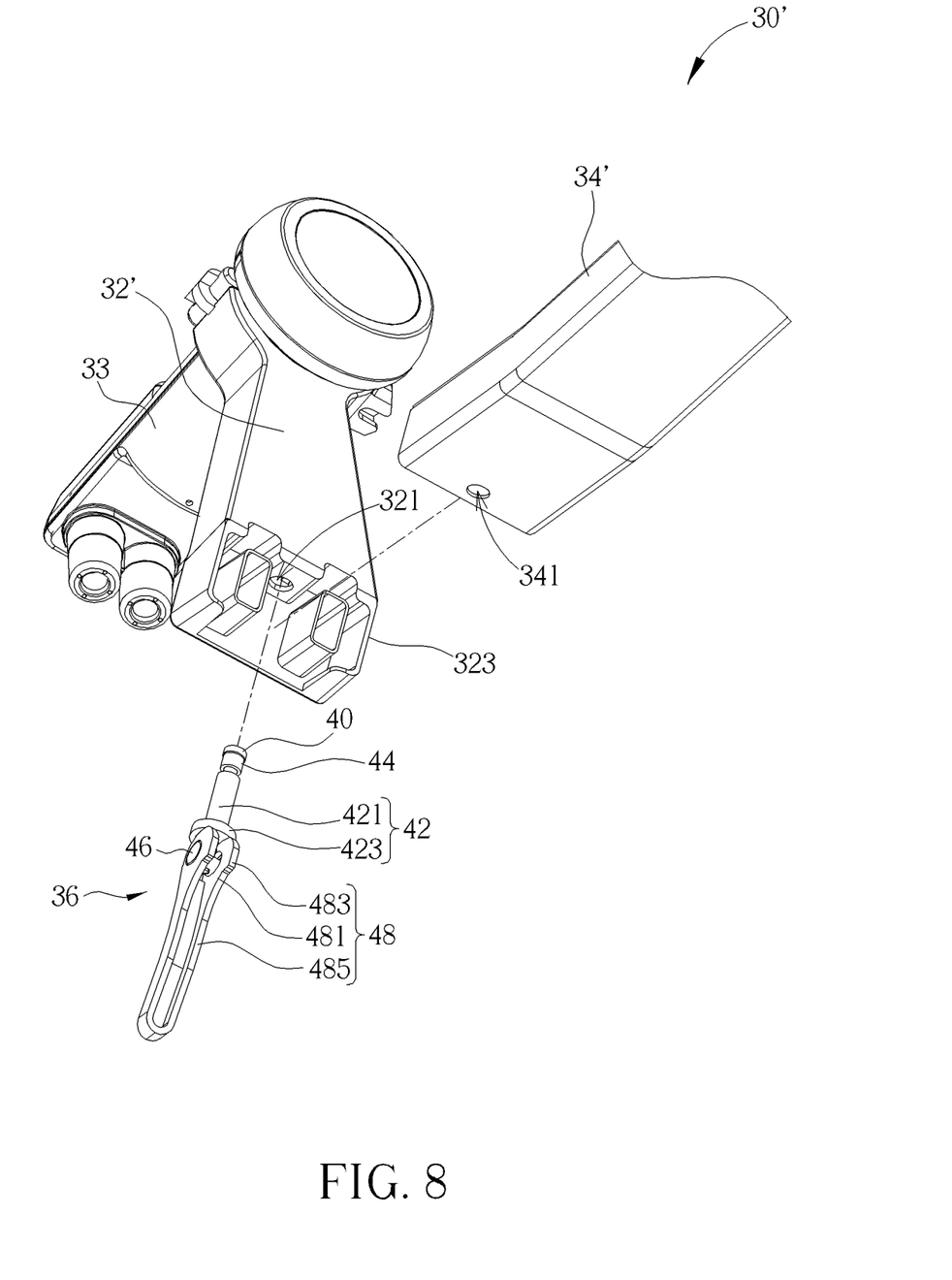
FIG. 8 is an exploded diagram of the antenna device according to another embodiment of the present invention.

It should be noticed that implementations of the fixing mechanism 36 are not limited to those mentioned in this embodiment. Please refer to FIG. 7 and FIG. 8. FIG. 7 is a diagram of an antenna device 30' according to another embodiment of the present invention. FIG. 8 is an exploded diagram of the antenna device 30' according to another embodiment of the present invention. As shown in FIG. 7 and FIG. 8, the main difference between the antenna device 30' and the aforesaid antenna device 30 is that a bridging structure 323 is disposed on a first frame 32' of the antenna device 30', and the bridging structure 323 is used for bridging a second frame 34' of the antenna device 30'. Thus, the first frame 32' and the second frame 34' of the antenna device 30' can be positioned in advance during assembly for facilitate the fixing mechanism 36 to fix the first frame 32' and the second frame 34'. Components with denoted in this embodiment identical to those in the aforesaid embodiment have identical structures and functions, and further description is omitted herein for simplicity.

Figure 9:
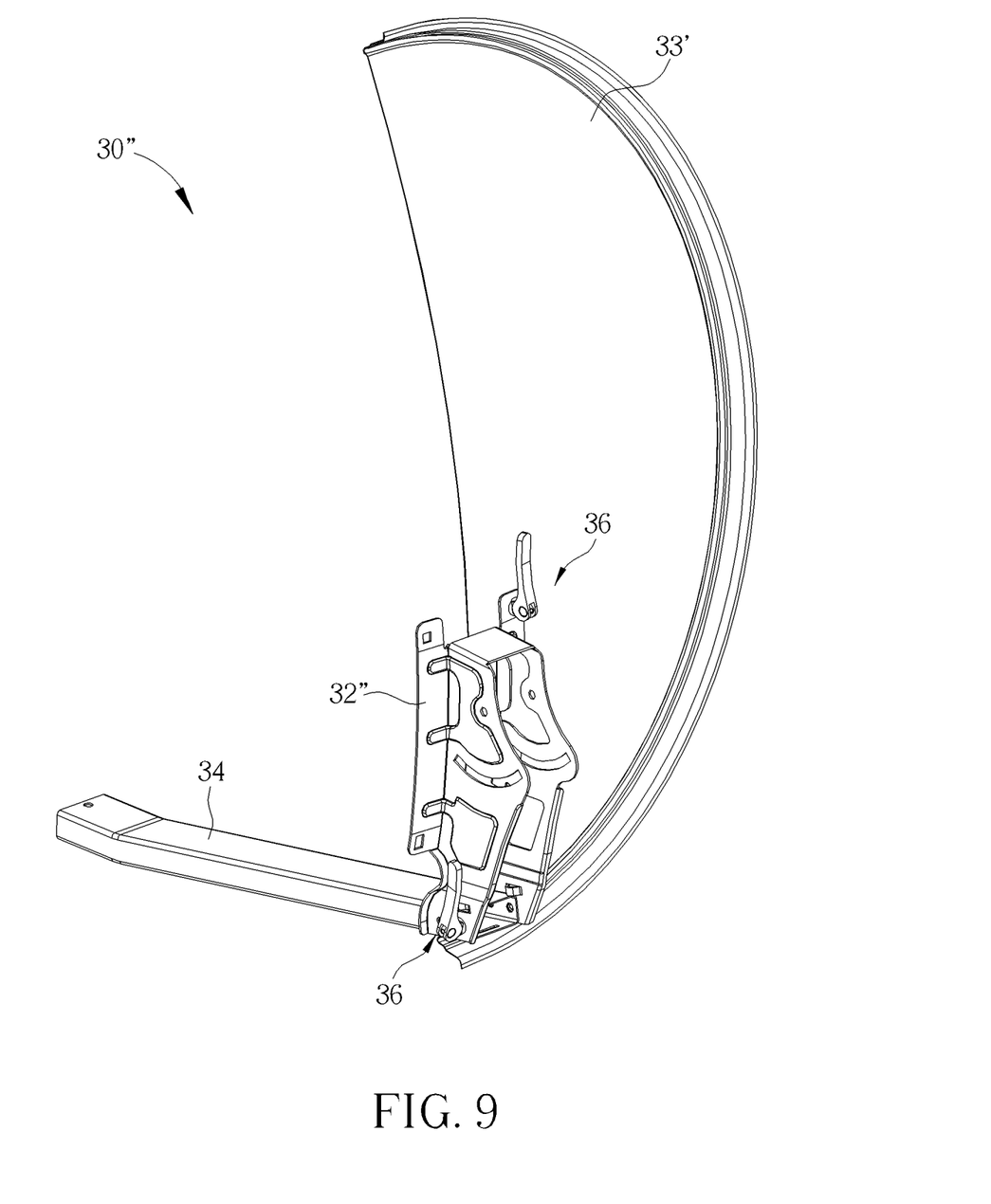
FIG. 9 is a diagram of an antenna device according to another embodiment of the present invention.

In addition, please refer to FIG. 9. FIG. 9 is a diagram of an antenna device 30" according to another embodiment of the present invention. As shown in FIG. 9, the main difference between the antenna device 30" and the aforesaid antenna device 30 is that an antenna component 33' of the antenna device 30" is disk-shaped, i.e. the antenna component 33' of the antenna device 30" is a disk-shaped antenna. Furthermore, a holder 32" of the antenna device 30" is used for holding the antenna component 33'. In this embodiment, the fixing mechanism 36 is used for fixing the antenna component 33' and the holder 32", and the fixing mechanism 36 is further used for fixing the holder 32" and the supporting tube 34. Components with denoted in this embodiment identical to those in the aforesaid embodiment have identical structures and functions, and further description is omitted herein for simplicity.

Compared to the prior art, the fixing mechanism of the present invention utilizes the handle for pushing the sleeve member and for driving the pivot member to activate the shaft as the handle is rotated, so as to pull the constraining member for making the constraining member and the sleeve member cooperatively compress the resilient bushing, resulting in that the resilient bushing generates the radial deformation for engaging with the first fixing structure of the first frame and the second fixing structure of the second frame. In other words, the fixing mechanism of the present invention is capable of fixing first frame and the second frame without screws, and the fixing mechanism of the present invention fixes the first frame and the second frame by rotating the handle. As a result, it results in easy assembly and convenience for a user to install and use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing mechanism, comprising:
   a shaft;
   a constraining member connected to an end portion of the shaft;
   a sleeve member sheathing the shaft, the sleeve member comprising:
      a sleeve portion sheathing the shaft and disposed through a first fixing structure of a first frame and a second fixing structure of a second frame; and
      a stop portion immovably connected to the sleeve portion, wherein a section area of the stop portion is greater than a section area of the sleeve portion;
   a resilient bushing sheathing the shaft and being disposed between the constraining member and the sleeve portion of the sleeve member;
   a pivot member connected to the other end portion of the shaft; and
   a handle pivoted to the pivot member and abutting against the stop portion of the sleeve member, the handle pushing the stop portion of the sleeve member and driving the pivot member to activate the shaft to pull the constraining member when the handle pivots relative to the pivot member, so that the constraining member and the sleeve portion of the sleeve member cooperatively compress the resilient bushing, so as to make the resilient bushing generate a radial deformation, wherein the stop portion abuts against the second frame when the sleeve portion is disposed through the first fixing structure and the second fixing structure, and then the handle pivots about the pivot member, so as to fix the sleeve portion relative to the second frame.

2. The fixing mechanism of claim 1, wherein the handle comprises:
   a pivotal portion pivoted to the pivot member;
   a pressing cam protruding from the pivotal portion; and
   a handle portion connected to the pivotal portion, the handle portion being for rotating the pivotal portion to drive the pressing cam to press the stop portion of the sleeve member.

3. The fixing mechanism of claim 1, wherein the pivot member is screwed to the other end portion of the shaft.

4. The fixing mechanism of claim 1, wherein the constraining member and the end portion of the shaft are integrally formed.

5. The fixing mechanism of claim 1, wherein the fixing mechanism is for fixing a first frame and a second frame, the second frame is detachably installed on the first frame, the first frame comprises a first fixing structure, the second frame comprises a second fixing structure, the sleeve member is disposed through the first fixing structure of the first frame and the second fixing structure of the second frame when the first frame is installed on the second frame, the resilient bushing is exposed on the first frame and the second frame when the sleeve member is disposed through the first fixing structure of the first frame and the second fixing structure of the second frame, and the resilient bushing engages with the first fixing structure of the first frame and the second fixing structure of the second frame as being compressed to generate the radial deformation by the constraining member and the sleeve member.

6. The fixing mechanism of claim 5, wherein the first frame is an antenna holder, and the second frame is an antenna supporting tube.

7. An antenna device, comprising:
   a first frame comprising a first fixing structure;
   a second frame detachably installed on the first frame, the second frame comprising a second fixing structure; and
   a fixing mechanism for fixing the first frame and the second frame, comprising:
      a shaft;
      a constraining member connected to an end portion of the shaft;
      a sleeve member sheathing the shaft, the sleeve member comprising:
         a sleeve portion sheathing the shaft and disposed through the first fixing structure of the first frame and the second fixing structure of the second frame; and
         a stop portion immovably connected to the sleeve portion, wherein a section area of the stop portion is greater than a section area of the sleeve portions;
      a resilient bushing sheathing the shaft and being disposed between the constraining member and the sleeve portion of the sleeve member, the resilient bushing being exposed on the first frame and the second frame when the sleeve portion of the sleeve member is disposed through the first fixing structure of the first frame and the second fixing structure of the second frame;
      a pivot member connected to the other end portion of the shaft; and
      a handle pivoted to the pivot member and abutting against the stop portion of the sleeve member, the handle pushing the stop portion of the sleeve member and driving the pivot member to activate the shaft to pull the constraining member when the handle pivots relative to the pivot member, so that the constraining member and the sleeve portion of the sleeve member cooperatively compress the resilient bushing, so as to make the resilient bushing generate a radial deformation for engaging with the first fixing structure of the first frame and the second fixing structure of the second frame, wherein the stop portion abuts against the second frame when the sleeve portion is disposed through the first fixing structure and the second fixing structure and then the handle pivots about the pivot member, so as to fix the sleeve portion relative to the second frame.

8. The antenna device of claim 7, wherein the handle comprises:
   a pivotal portion pivoted to the pivot member;
   a pressing cam protruding from the pivotal portion; and
   a handle portion connected to the pivotal portion, the handle portion being for rotating the pivotal portion to drive the pressing cam to press the stop portion of the sleeve member.

9. The antenna device of claim 7, wherein the pivot member is screwed to the other end portion of the shaft.

10. The antenna device of claim 7, wherein the constraining member and the end portion of the shaft are integrally formed.

11. The antenna device of claim 7, wherein the first fixing structure and the second fixing structure are respectively a through hole structure.

12. The antenna device of claim 7, wherein the first frame is an antenna holder, and the second frame is an antenna supporting tube.

* * * * *